US012659670B2

(12) United States Patent
Chen et al.

(10) Patent No.: US 12,659,670 B2
(45) Date of Patent: Jun. 16, 2026

(54) VIBRATION DEVICE, A BONE CONDUCTION HEADPHONE, AND AN INTELLIGENT HARDWARE DEVICE

(71) Applicant: Suzhou Thor Electronic Technology Co., Ltd., Jiangsu (CN)

(72) Inventors: Juan Chen, Jiangsu (CN); Hongbin Cao, Jiangsu (CN)

(73) Assignee: Suzhou Thor Electronic Technology Co., Ltd., Jiangsu (CN)

( * ) Notice: Subject to any disclaimer, the term of this patent is extended or adjusted under 35 U.S.C. 154(b) by 152 days.

(21) Appl. No.: 18/690,269

(22) PCT Filed: Sep. 9, 2022

(86) PCT No.: PCT/CN2022/118149
§ 371 (c)(1),
(2) Date: Mar. 8, 2024

(87) PCT Pub. No.: WO2023/036303
PCT Pub. Date: Mar. 16, 2023

(65) Prior Publication Data

US 2024/0381031 A1 Nov. 14, 2024

(30) Foreign Application Priority Data

Sep. 10, 2021 (CN) ......................... 202111062238.3
Sep. 10, 2021 (CN) ......................... 202111063993.3

(51) Int. Cl.
*H04R 11/02* (2006.01)
*H04R 1/10* (2006.01)
(Continued)

(52) U.S. Cl.
CPC ............... *H04R 9/025* (2013.01); *H04R 1/10* (2013.01); *H04R 9/045* (2013.01); *H04R 9/046* (2013.01); *H04R 9/06* (2013.01); *H04R 2460/13* (2013.01)

(58) Field of Classification Search
CPC ......... H04R 11/00; H04R 11/02; H04R 11/06; H04R 2209/022; H04R 2209/024; H04R 2400/07; H04R 2460/13
See application file for complete search history.

(56) References Cited

U.S. PATENT DOCUMENTS

2015/0163589 A1* 6/2015 Haddad .................... H02K 1/34
381/369
2023/0421962 A1* 12/2023 Terada .................... H01F 7/066

FOREIGN PATENT DOCUMENTS

CN 205283368 6/2016
CN 206341114 7/2017
(Continued)

OTHER PUBLICATIONS

"International Search Report (Form PCT/ISA/210) of PCT/CN2022/118149", mailed on Nov. 11, 2022, with English translation thereof, pp. 1-5.

*Primary Examiner* — Ryan Robinson
(74) *Attorney, Agent, or Firm* — JCIPRNET

(57) ABSTRACT

The invention discloses a vibration device, a bone conduction headphone, and an intelligent hardware device, which belong to the field of vibration technology. The vibration device comprises: a case; an electromagnetic driving part including a coil connected to the case; and a vibrator, including a magnetic part movably arranged in the coil and an elastic part connected between the magnetic part and the case; the magnetic part includes at least two magnet portions and a non-magnetic portion located between two adjacent magnet portions. In the present invention, the magnetic part
(Continued)

is made of magnetic material integrally magnetized. Compared with the original structure that requires multiple magnets to be connected, it has fewer parts, and is more convenient to install, while also achieving higher dimensional accuracy, thereby improving the assembly accuracy with the coil.

15 Claims, 10 Drawing Sheets

(51) Int. Cl.

| | |
|---|---|
| ***H04R 9/02*** | (2006.01) |
| ***H04R 9/04*** | (2006.01) |
| ***H04R 9/06*** | (2006.01) |

(56) References Cited

FOREIGN PATENT DOCUMENTS

| | | | | | |
|---|---|---|---|---|---|
| CN | 207691660 | | | 8/2018 | |
| CN | 109862143 | | | 6/2019 | |
| CN | 110233560 | | | 9/2019 | |
| CN | 111682731 | A | * | 9/2020 | ............. H02K 33/02 |
| CN | 111969893 | | | 11/2020 | |
| CN | 113271513 | | | 8/2021 | |
| CN | 113873381 | | | 12/2021 | |
| CN | 113904479 | | | 1/2022 | |
| KR | 20160004693 | | | 1/2016 | |
| KR | 20210007809 | A | * | 1/2021 | ............. H04R 11/02 |
| KR | 20210018044 | A | * | 2/2021 | ............. H04R 9/045 |
| WO | WO-2013020794 | A1 | * | 2/2013 | ................ B22F 7/06 |

* cited by examiner

VIBRATION DEVICE, A BONE CONDUCTION HEADPHONE, AND AN INTELLIGENT HARDWARE DEVICE

CROSS-REFERENCE TO RELATED APPLICATION

This application is a 371 of international application of PCT application serial no. PCT/CN2022/118149, filed on Sep. 9, 2022, which claims the priority benefit of China applications serial no. 202111062238.3 and serial no. 202111063993.3 filed on Sep. 10, 2021. The entirety of each of the above-mentioned patent applications is hereby incorporated by reference herein and made a part of this specification.

TECHNICAL FIELD

The invention relates to the field of vibration technology, in particular to a vibration device, a bone conduction headphone, a wearable device and an intelligent hardware device.

RELATED ART

Vibration devices, such as bone conduction acoustic devices for vibrating sound production and linear vibration motors for providing vibration feedback, etc., usually include a case and vibrators, coils and shrapnels all arranged in the case, the coil is used to drive the vibrator to vibrate, and the shrapnel is connected between the vibrator and the case, which may drive the vibrator to reset.

At present, the vibration device has the following defects: first, in order to improve the magnetic force of the vibrator, the vibrator is set to include multiple magnets, and two adjacent magnets are separated by a magnetic conductor, this structure increases the number of components, makes assembly more difficult, and the accuracy of assembly is poor, and the vibrator is easy to contact with the coil when vibrating, which affects the reliability of the vibration device; second, the existing vibration device is usually provided with shrapnel at only one end of the vibrator, which makes the vibration device less stable when vibrating, and it is easy to sway left and right in the length direction, and the phenomenon of rolling vibration occurs, as a result, the vibration system exhibits nonlinear vibration, the vibrator touches other parts to cause noise, which is likely to cause increased sound distortion for bone conduction acoustic devices.

Therefore, it is necessary to improve the prior art to overcome the defects in the prior art.

SUMMARY OF INVENTION

The object of the present invention is to provide a vibration device, a bone conduction headphone, a wearable device and an intelligent hardware device, the assembly of the vibration device is more convenient and it is easier to ensure its assembly accuracy.

Solution to Problem

In order to achieve the above-mentioned purpose of the invention, in a first aspect, the present invention proposes a vibration device, comprising:

a case;

an electromagnetic driving part, including a coil connected to the case; and a vibrator, including a magnetic part movably arranged in the case and an elastic part connected between the magnetic part and the case, the coil surrounding the outside of the magnetic part;

the magnetic part includes at least two magnet portions and a non-magnetic portion located between two adjacent magnet portions.

Further, the magnetic part is a component.

Further, the coil is arranged corresponding to the non-magnetic portion, the thickness of the coil is the same as the thickness of the non-magnetic portion; or, the thickness of the coil is greater than the thickness of the non-magnetic portion, and the two ends of the coil extend to the outer peripheries of the two magnet portions adjacent to the non-magnetic portion.

Further, the magnetic poles of the magnet portion and the non-magnetic portion are arranged along the axis of the magnetic part, and the polarities of the two adjacent magnetic poles of the two adjacent magnet portions are the same.

Further, the gap between the magnetic part and the coil is 0.05-0.6 mm.

Further, the thickness of the non-magnetic portion is above 0.3 mm.

Further, the maximum value of the thickness of the non-magnetic portion is smaller than the minimum value of the thickness of any one of the magnet portions.

Further, the number of elastic parts is two, and the two elastic parts are respectively connected to two ends of the magnetic part.

Further, the elastic part comprises a first installation portion, a second installation portion surrounding the outer periphery of the first installation portion, and an arm portion connected between the first installation portion and the second installation portion, wherein the first installation portion is connected with the magnetic part, and the second installation portion is connected to the case.

Further, the magnetic part is connected to the first installation portion, and the outer peripheral surface of the magnetic part does not exceed the the outer peripheral surface of the first installation portion: or, a partition plate is connected between the magnetic part and the first installation portion, and the outer peripheral surface of the partition plate does not exceed the outer periphery surface of the first installation portion.

Further, the vibration device further comprises a first cover and a second cover connected to both ends of the case, both the first cover and the second cover are provided with an avoidance cavity for avoiding the arm portion and the first installation portion during the movement of the vibrator.

Further, the coil is arranged in the inner cavity of the case or connected to the outside of the case.

Further, the magnetic part is made by integrally magnetizing the part to be magnetized, when magnetizing, the part to be magnetized is passed through the magnetic conductive sleeve and the polyurethane sleeve, the magnetic conductive sleeve corresponds to the position on the part to be magnetized for forming the non-magnetic portion, the polyurethane sleeve corresponds to the position on the part to be magnetized for forming the magnet portion, a coil set is correspondingly arranged on the outside of the polyurethane sleeve, and the coil set includes one or more magnetizing coils.

Further, during magnetization, the directions of the magnetic fields generated by the adjacent two coil sets corresponding to the positions of the two adjacent polyurethane sleeves are opposite.

In a second aspect, the present invention also proposes a bone conduction headphone, including the vibration device described in any one of the above items.

In a third aspect, the present invention also proposes a wearable device, including the vibration device described in any one of the above items.

In a fourth aspect, the present invention also proposes an intelligent hardware device, including the vibration device described in any one of the above items.

Effects of Invention

Compared with the prior art, the present invention has the following beneficial effects:

1. In the present invention, the magnetic part is made of magnetic material integrally magnetized, compared with the original structure that requires multiple magnets to be connected, it is an integrated part with fewer parts and no assembly required, and is more convenient to install, while also achieving higher dimensional accuracy, thereby improving the assembly accuracy with the coil, reducing the risk of contact and collision between the magnetic part and the coil during the vibration process, so the reliability is higher;
2. Due to the high dimensional accuracy of the magnetic part, the gap between it and the coil may be set smaller, so that the driving force of the coil to the magnetic part is greater, and the sensitivity of the vibration device is higher;
3. In the present invention, both ends of the magnetic part are provided with elastic parts, so that the force on both ends of the magnetic part is more symmetrical, the vibration device can perform linear vibration more stably, and the undesirable phenomenon of rolling vibration is less likely to occur.

DESCRIPTION OF EMBODIMENTS

Figure 1:
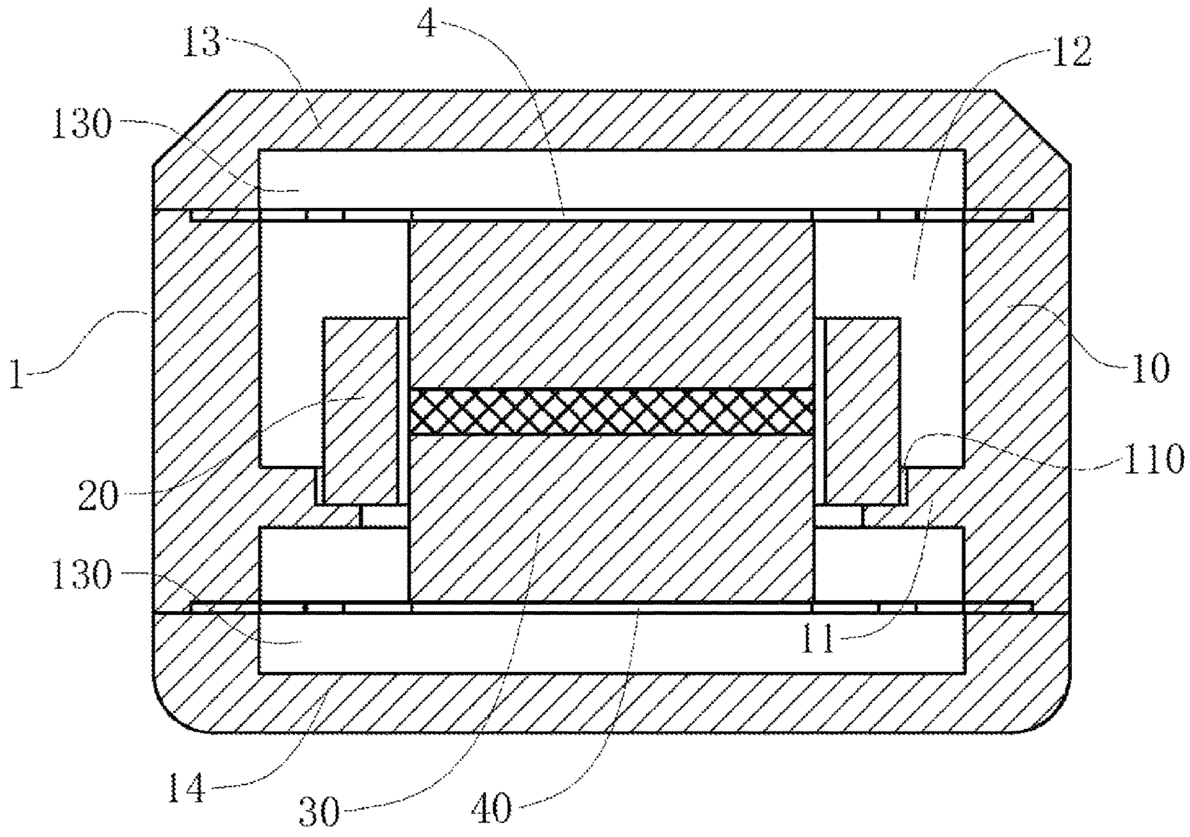
FIG. 1 is a structural schematic diagram of an embodiment of the vibration device in the present invention, in which the coil is located inside the case.

In order to make the above purpose, features and advantages of the present application more obvious and understandable, the detailed description of the application will be described in detail below in conjunction with the drawings. It should be understood that the specific embodiments described here are only used to explain the present application, but not to limit the present application. In addition, it should be noted that, for the convenience of description, only some structures related to the present application are shown in the drawings but not all structures. Based on the embodiments in this application, all other embodiments obtained by persons of ordinary skill in the art without making creative efforts belong to the scope of protection of this application.

The terms "comprising" and "having" and any variations thereof in this application are intended to cover a non-exclusive inclusion. For example, a process, method, system, product or device comprising a series of steps or units is not limited to the listed steps or units, but optionally also includes unlisted steps or units, or optionally further includes other steps or units inherent to these processes, methods, products or devices.

Reference herein to an "embodiment" means that a particular feature, structure, or characteristic described in connection with the embodiment may be included in at least one embodiment of the present application. The occurrences of this phrase in various places in the description are not necessarily all referring to the same embodiment, nor are independent or alternative embodiments mutually exclusive of other embodiments. It is understood explicitly and implicitly by those skilled in the art that the embodiments described herein may be combined with other embodiments.

Figure 10:
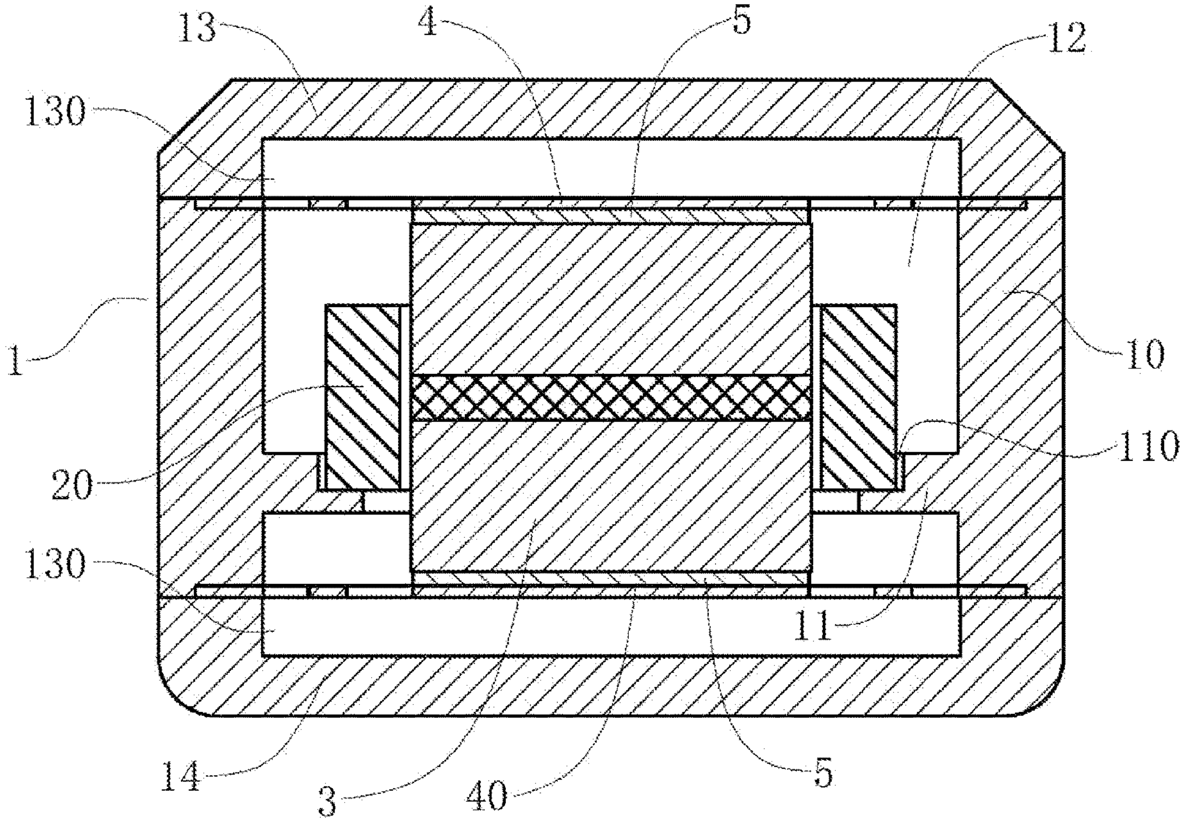
FIG. 10 is a structural schematic diagram of an embodiment of the vibration device in the present invention.
Figure 11:
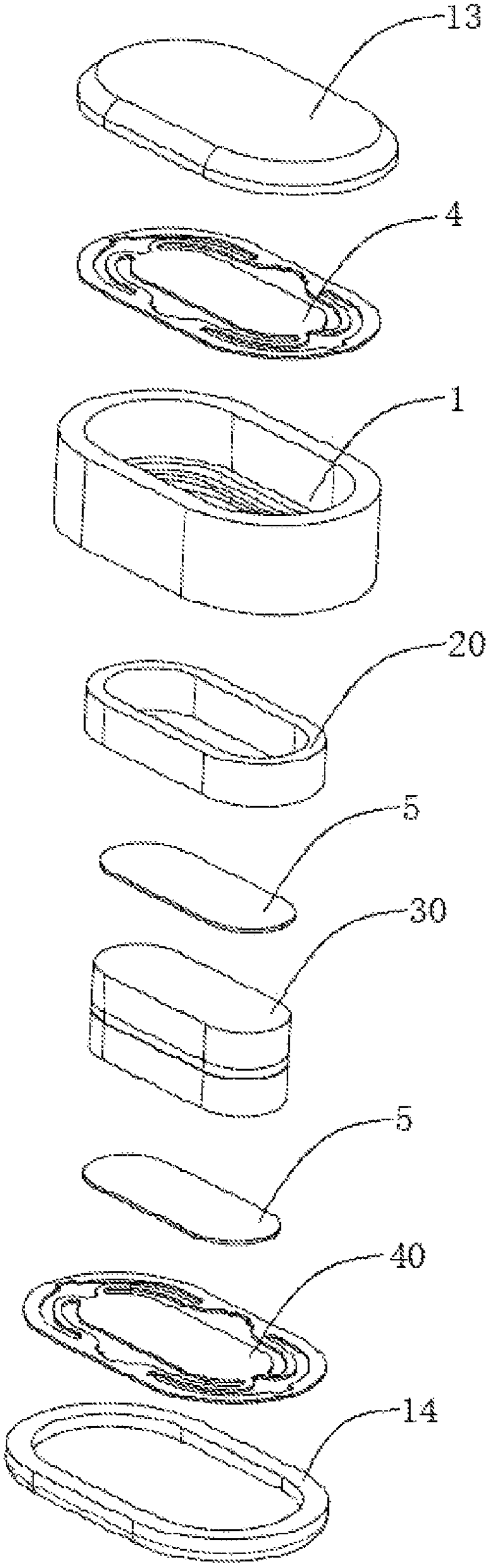
FIG. 11 is an exploded view of the vibration device shown in FIG. 10.

The vibration device corresponding to a preferred embodiment of the present invention includes a case 1, an electromagnetic driving part connected to the case 1, and a vibrator driven by the electromagnetic driving part to vibrate. The types of the vibration device are not limited, for example, it may be the bone conduction acoustic device shown in FIG. 1. FIG. 2, FIG. 10 and FIG. 11, or the vibration motor shown in FIG. 3.

The case 1 includes a ring-shaped body 10, and the shape of the body 10 is not limited. For example, its cross-sectional shape may be circular, rectangular, or racetrack-shaped, etc., and FIG. 2 shows the situation that the body 10 is racetrack-shaped. An inner cavity 12 is formed in the body 10, and the vibrator is installed in the inner cavity 12, the electromagnetic driving part includes a coil 20, and the coil 20 may be installed inside or outside the inner cavity 12. The vibrator includes a magnetic part 30 passing through the coil 20 and at least one elastic part connected between the magnetic part 30 and the body 10 of the case 1. The coil 20 is used for passing through current to drive the vibrator to vibrate. Specifically, after the coil 20 is energized, it will generate an electromagnetic field, by controlling parameters such as the direction and magnitude of the current in the coil 20, the polarity and strength of the electromagnetic field may be changed, thereby driving the magnetic part 30 to vibrate, the elastic part may drive the magnetic part 30 to reset, so that the magnetic part 30 is driven to reciprocate by the coil 20. The electromagnetic driving part may also include a control circuit board electrically connected to the coil 20 to control the current in the coil 20.

Figure 2:
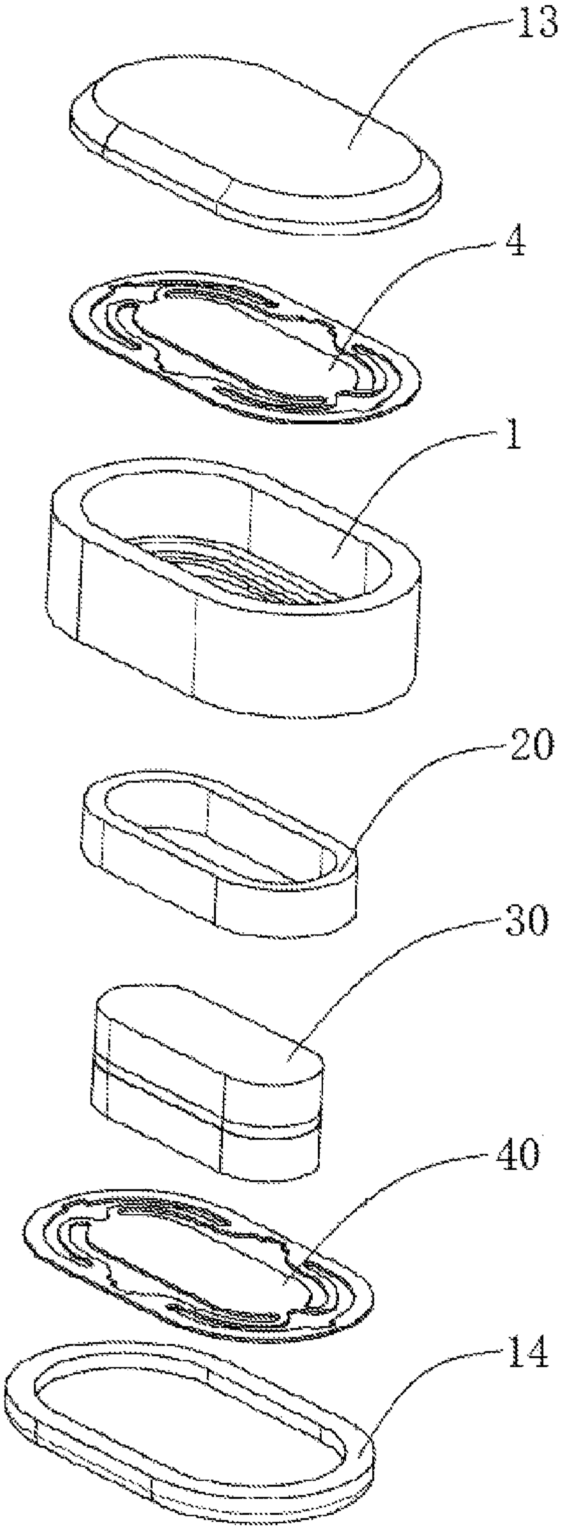
FIG. 2 is an exploded view of the vibration device shown in FIG. 1.

In a preferred embodiment, as shown in FIG. 1, the coil 20 is disposed inside the case 1, the magnetic part 30 is passed through the coil 20, its shape is adapted to the shape of the inner hole of the coil 20, and it is arranged coaxially with the coil 20, and may move along the axis of the coil 20. In this embodiment, the case 1 further includes a fixing part 11 connected to the body 10, the fixing part 11 protrudes from the body 10 into the inner cavity 12, and the coil 20 is installed on the fixing part 11, the installation methods between the two include but are not limited to bonding, welding and bolting.

The shape of the fixing part 11 is not limited, in this embodiment, its shape is consistent with the body 10, and it is also in the shape of a ring (specifically, a racetrack shape), preferably, the fixing part 11 is a complete ring shape, so as to increase the contact area between it and the electromagnetic driving part, so that the fixing part 11 may more stably support the electromagnetic driving part. In other embodiments, the fixing part 11 may also be an intermittent ring shape with several gaps. The fixing part 11 may be integrally formed with the body 10, or may be an independent component connected to the body 10.

Further, in order to make the position of the coil 20 on the fixing part 11 more accurate, a positioning groove 110 is also provided on the fixing part 11, and the shape of the positioning groove 110 is adapted to the shape of the coil 20, so that the coil 20 may be accurately positioned in the positioning groove 110 and the installation accuracy of the coil 20 in the inner cavity 12 is improved.

Figure 3:
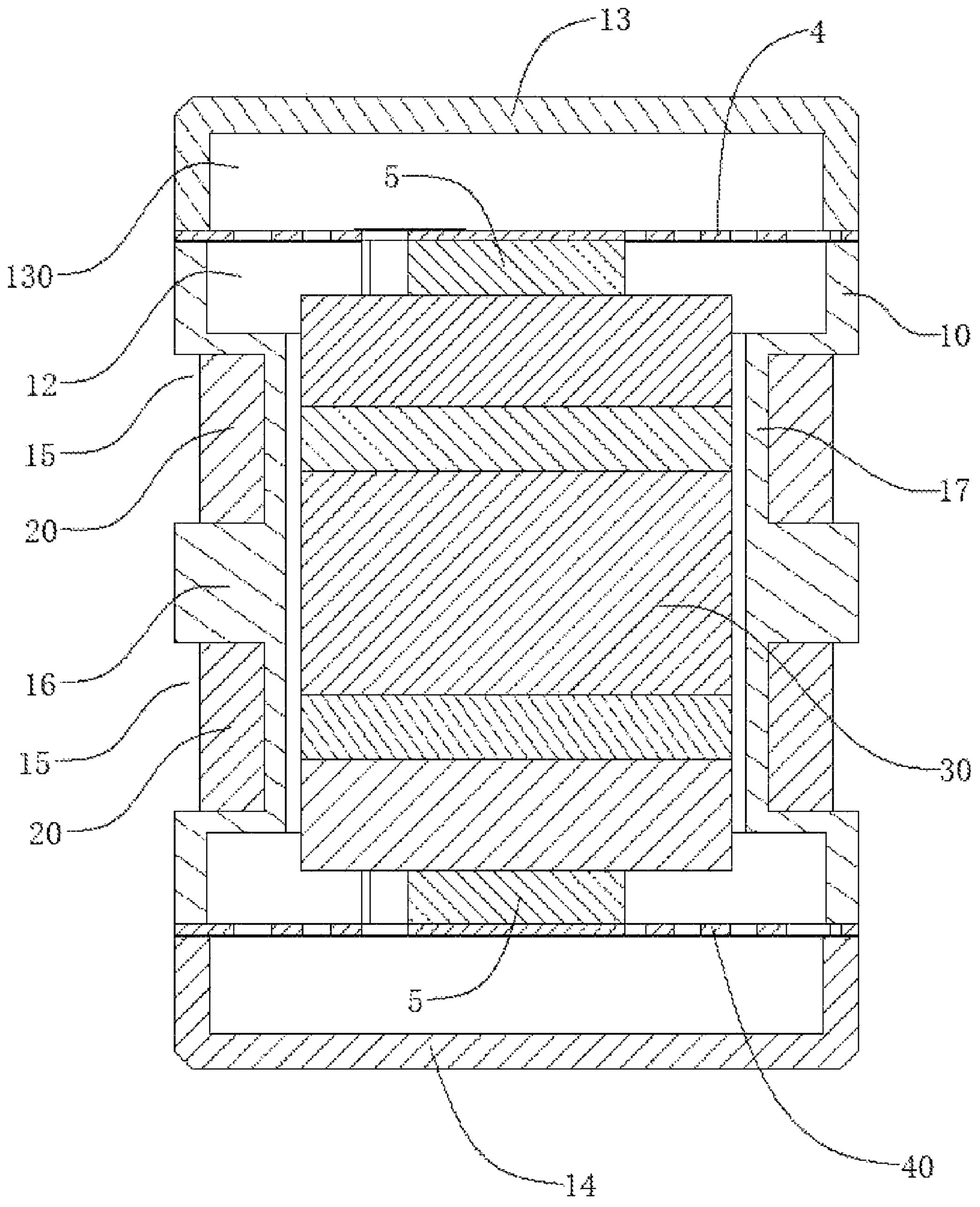
FIG. 3 is a structural schematic diagram of an embodiment of the vibration device in the present invention, in which the coil is located outside the case.

In another preferred embodiment, as shown in FIG. 3, the coil 20 may also be arranged outside the case 1. In this embodiment, the outer surface of the case 1 is provided with an annular groove 15, and the coil 20 is arranged in the annular groove 15 and limited by the annular groove 15. In the case of multiple coils 20, there may be multiple annular grooves 15, and two adjacent annular grooves 15 may be separated by an annular boss 16. In this embodiment, the magnetic part 30 and the coil 20 are separated by the wall part 17 of the case 1, the dimensional accuracy of the case 1 is higher, therefore, the assembly accuracy between the magnetic part 30 and the wall part 17 is easier to control.

Figure 4:
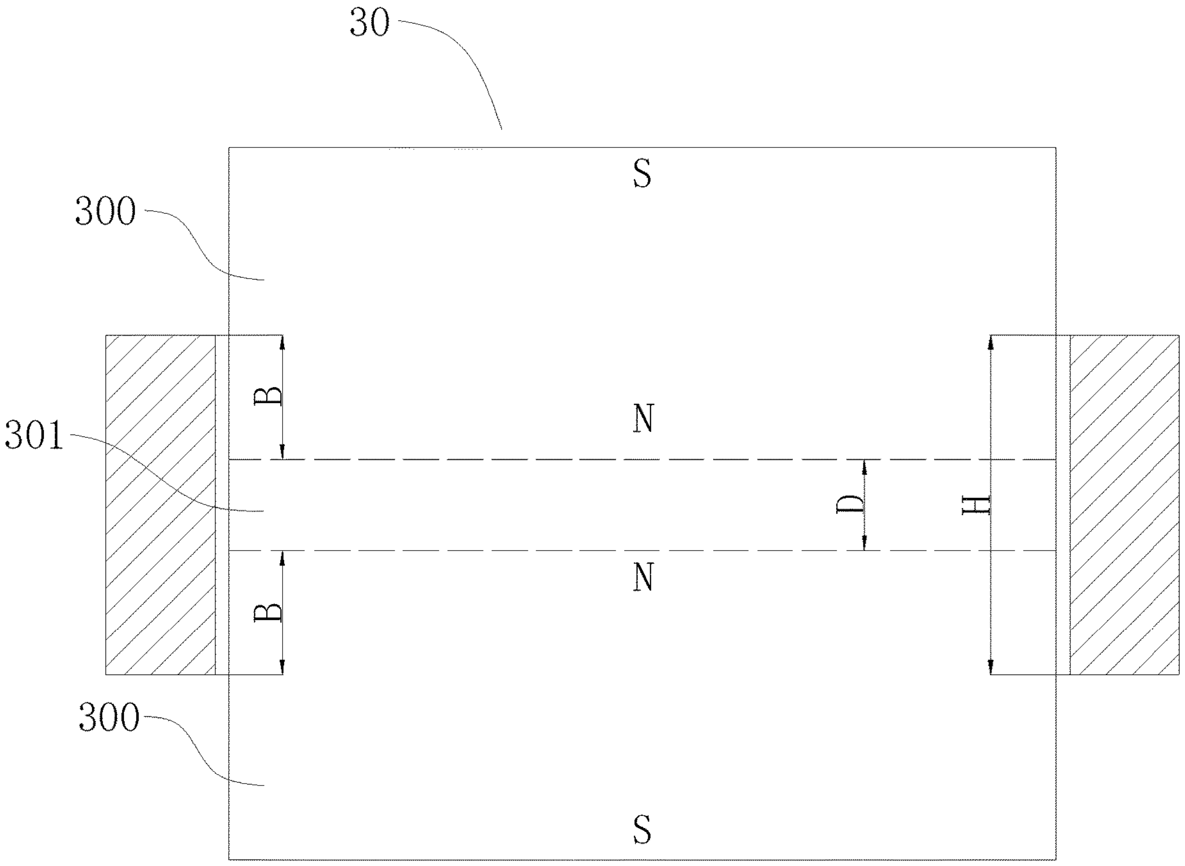
FIG. 4 is a schematic view of the magnetic part fitted in the coil in the present invention, in which the magnetic part has a non-magnetic area.

As shown in FIG. 4, in the present invention, the magnetic part 30 is formed by integrally magnetizing magnetic materials, the magnetic material may be, for example, ferrite, neodymium iron boron, alnico, samarium cobalt and the like. The magnetic part 30 includes at least two magnet portions 300 and a non-magnetic portion 301 located between two adjacent magnet portions 300. It can be understood that the magnet portion 300 and the non-magnetic portion 301 are part of the magnetic part 30 rather than separate component, that is to say, the magnetic part 30 is a single part, rather than an assembly formed by connecting two or more parts. Each magnet portion 300 includes two magnetic poles, which are N pole and S pole respectively, and the polarities of the two adjacent magnetic poles of two adjacent magnet portions 300 are the same, which may make the magnetic force line concentrate and approximately vertically pass through the coil 20. After the coil 20 is energized, a greater driving force may be generated, and the driving force and sensitivity of the vibration device may be improved. A plurality of magnet portions 300 are arranged along the axis of the magnetic part 30, and the non-magnetic portion 301 separates two adjacent magnet portions 300, that is, the magnetic poles of the magnet portion 300 and the non-magnetic portion 301 are arranged along the axis of the magnetic part 30.

Figure 5:
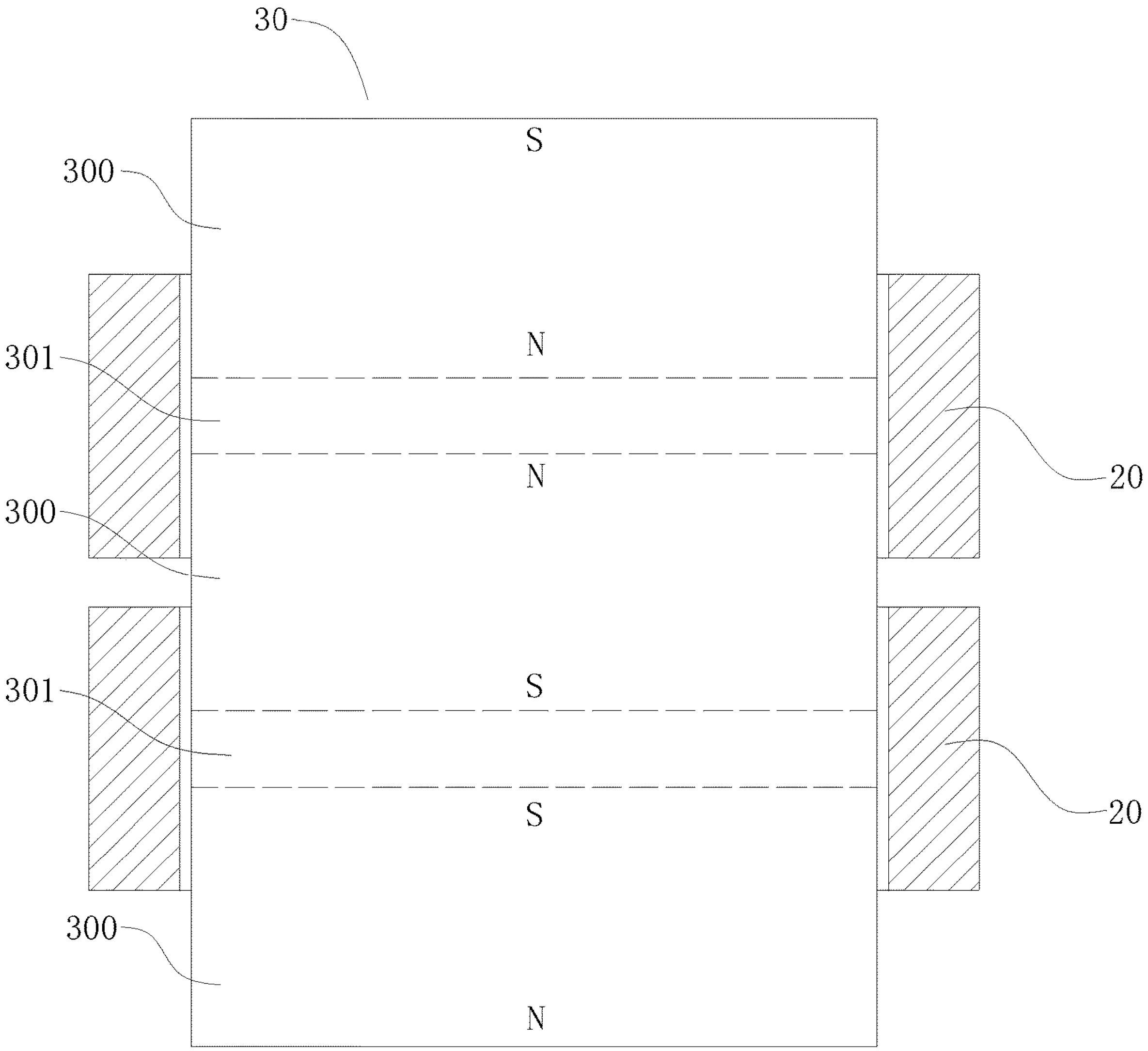
FIG. 5 is a schematic view of the magnetic part fitted in the coil in the present invention, in which the magnetic part has two non-magnetic areas.

The magnetic part 30 includes at least one non-magnetic portion 301 and two magnet portions 300, of course, its number is not limited thereto, for example, as shown in FIG. 5, it may have two non-magnetic portions 301 and three magnet portions 300, for the situation that there are more non-magnetic portions 301, the same may be deduced. In case of multiple non-magnetic portions 301, the thicknesses of the multiple non-magnetic portions 301 may be the same or different. As a preferred embodiment, the thickness of the non-magnetic portion 301 is more than 0.3 mm, and its maximum value is smaller than the minimum value of any one magnet portion 300 thickness. If the thickness of the non-magnetic portion 301 is too small, the boundary between the magnet portion 300 and the non-magnetic portion 301 would be unclear, which will affect the performance of the magnetic part 30, if it is too large, the magnet portion 300 would become smaller accordingly, affecting the magnetic flux and B value.

Figure 6:
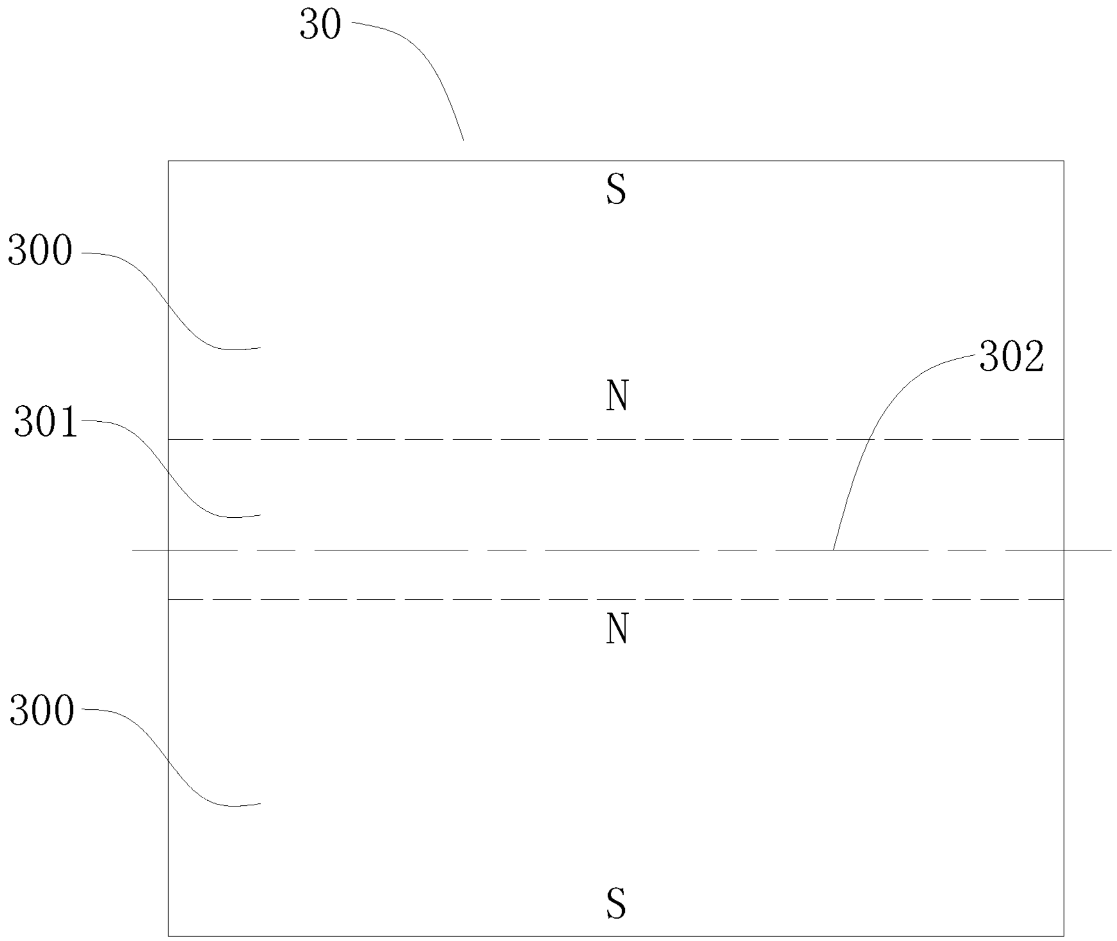
FIG. 6 is a schematic diagram of an embodiment of the magnetic part in the present invention, in which the magnet portion and the non-magnetic portion of the magnetic part are not symmetrical with respect to the first symmetrical plane.

The cross-sectional shape of the magnetic part 30 is not limited, for example, the cross-sectional shape may be a triangle, a circle, a rectangle and the like. The magnet portion 300 and the non-magnetic portion 301 formed on the magnetic part 30 may be symmetrical or asymmetrical with respect to the geometric symmetry plane 302 of the magnetic part 30, and FIG. 6 shows an asymmetrical situation.

Figure 7:
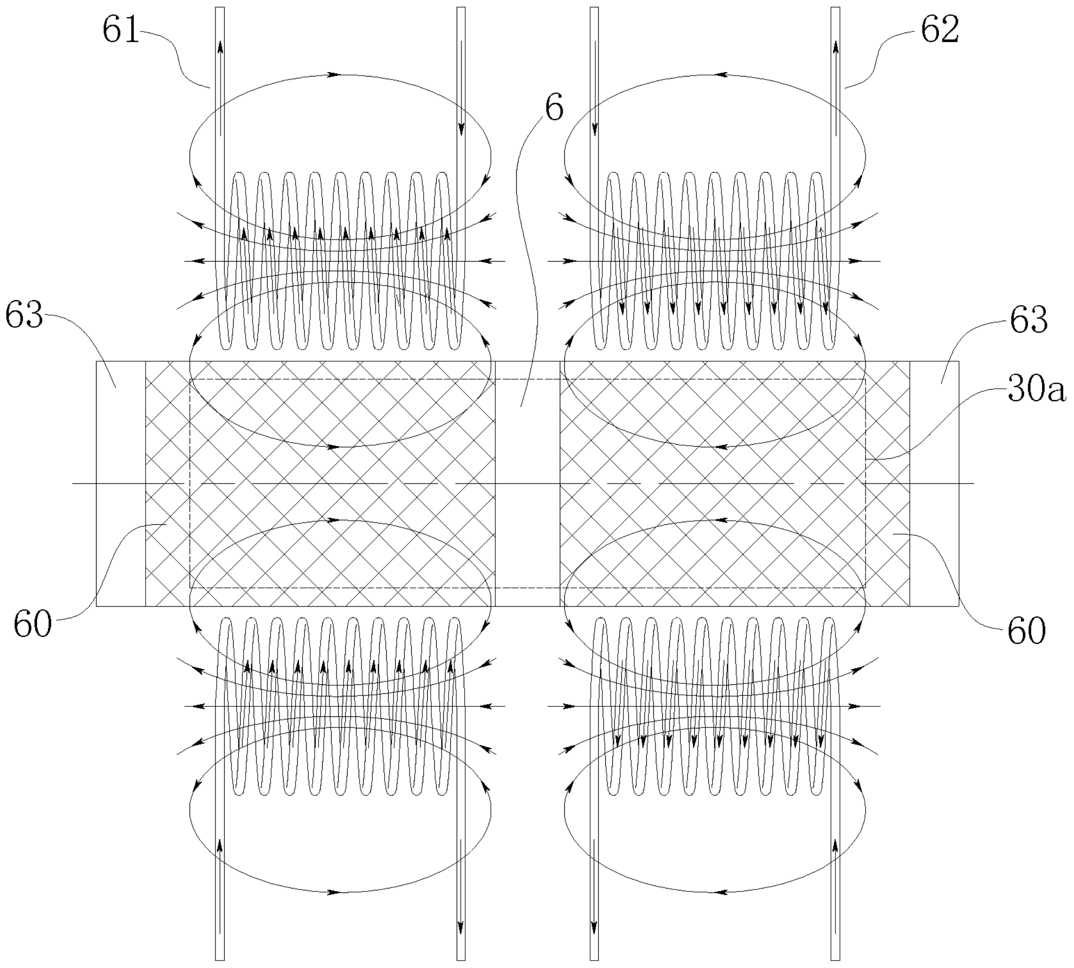
FIG. 7 is a schematic diagram of a magnetization method of the magnetic part in the present invention.
Figure 8:
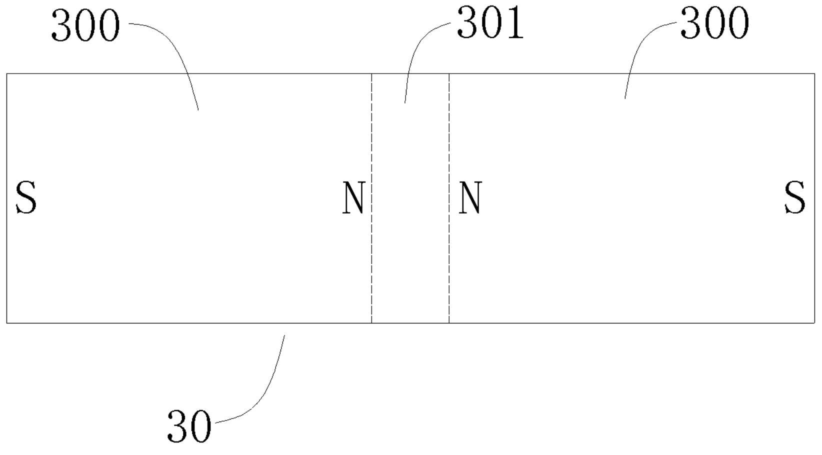
FIG. 8 is a schematic diagram of the magnetic part obtained by the magnetization method in FIG. 7.

The magnetic part 30 may be formed using the following magnetization method, for convenience of description, the magnetic part 30 that needs to be magnetized is called the part to be magnetized 30*a*, the part to be magnetized 30*a* becomes the magnetic part 30 after being magnetized, the magnetic part 30 that needs to be magnetized may be, for example, a non-magnetic blank or may be a magnetic part 30 that needs to be magnetized again after its magnetism is weakened. It can be understood that since the above-mentioned magnetic part 30 is a single part, the part to be magnetized 30*a* is also a single part which form the magnetic part 30 after magnetization. As shown in FIG. 7, the part to be magnetized 30*a* (the object shown by the dotted line in the figure) is inserted into the magnetic conductive sleeve 6 and the polyurethane sleeve 60, the position of the polyurethane sleeve 60 corresponds to the position that needs to be magnetized, that is, the magnet portion 300, and the magnetic conductive sleeve 6 is disposed at a position where magnetization is not required, that is, it is set on a position corresponding to the non-magnetic portion 301. The polyurethane sleeve 60 may be extended beyond the end of the part to be magnetized 30*a*, and a magnetic conductive block 63 may be provided at the end of the polyurethane sleeve 60 to seal the polyurethane sleeve 60 to enhance the magnetization effect. Then, the part to be magnetized 30*a* is placed among several coils, in the figure, two coil sets respectively arranged in the corresponding positions of the two polyurethane sleeves 60 are shown, which are respectively the first coil set 61 and the second coil set 62, both the first coil set 61 and the second coil set 62 include one or more magnetizing coils. The part to be magnetized 30*a* is located outside the magnetizing coil and is not inserted into the magnetizing coil. The current direction of the magnetizing coils in each coil set is the same, and the polarity of the magnetized magnet portion 300 may be changed by changing the current direction, for example, when the current directions of the first coil set 61 and the second coil set 62 are opposite, the first coil set 61 and the second coil set 62 generate magnetic fields with opposite magnetic force lines. The directions of the magnetic fields generated by the magnetizing coils are opposite, and the polarities of the two adjacent magnet portions 31 formed by the magnetization are also opposite. The magnetic conductive sleeve 6 is made of high magnetic conductive materials such as silicon steel sheets, it may draw out and guide away the magnetic force lines of the electromagnetic field generated by the coil set, thereby forming inside an area that shields the magnetic field, the polyurethane sleeve 60 may allow the magnetic force lines of the magnetic field to pass through, therefore, only the position of the part to be magnetized 30*a* corresponding to the polyurethane sleeve 60 is magnetized to form the magnet portion 300, and the position corresponding to the magnetic conductive sleeve 6 will not be magnetized to form non-magnetic portion 301, finally, the part to be magnetized 30*a* forms the magnetic part 30 as shown in FIG. 8, obviously, changing the direction of the current in the coil may change the polarity of the magnet portion 300.

Obviously, since the magnetic part 30 is a single part formed by magnetization, it does not need to be assembled, and its dimensional accuracy may be guaranteed by machining accuracy, compared with the method of connecting multiple magnets, it has higher dimensional accuracy, therefore, the assembly accuracy of the magnetic part 30 in the coil 20 is further improved, so that the magnetic part 30 is not easy to contact and collide with the coil 20 when it vibrates, ensuring the reliability and stability of operation, and avoiding the loss of the magnetic circuit caused by assembly errors. Moreover, when multiple magnets are connected, two magnets should be connected in such a way that the same poles of them are close to each other, due to the existence of repulsion, the connection is very difficult, which further reduces the dimensional accuracy after the connection is completed. While using magnetization to make the magnetic part 30 is more convenient to process, which may reduce the cost of accessories and labor costs during the assembly process, and improve production efficiency.

Furthermore, the transition between each magnet portion 300 and the non-magnetic portion 301 on the magnetic part 30 is very smooth, so that the surface magnetic field of the magnetic part 30 forms a relatively complete sinusoidal wave state distribution.

As mentioned above, the magnetic part 30 made by magnetization has better dimensional accuracy, therefore, the gap between it and the inner wall of the coil 20 may be smaller, for example, the gap between the inner wall of the coil 20 and the outer wall of the magnetic part 30 is set to 0.05~0.6 mm, generally, the smaller the gap between the coil 20 and the magnetic part 30, the greater the driving force of the coil 20 to the magnetic part 30, the greater the sensitivity of the vibration device. And the smaller the gap, the easier it is for the magnetic part 30 to collide with the coil 20 during movement. Therefore, it is further preferred that the gap is set to 0.15~0.3 mm to ensure a low risk of collision between the magnetic part 30 and the coil 20 and at the same time ensure that the coil 20 has sufficient driving force for the magnetic part 30.

As shown in FIG. 4, the position of the coil 20 corresponds to the non-magnetic portion 301, that is, the coil 20 is arranged around the outer periphery of the non-magnetic portion 301. The number of coils 20 is not limited to one, specifically, its number may be the same as or less than the number of non-magnetic portions 301, as shown in FIG. 5, the magnetic part 30 shown in FIG. 5 includes three magnet portions 300 and two non-magnetic portions 301, correspondingly, the number of coils 20 is also two, which are correspondingly arranged on the outer peripheries of the two non-magnetic portions 301.

The thickness H of the coil 20 may be the same as the thickness D of the non-magnetic portion 301, or may be greater than the thickness D of the non-magnetic portion 301. Preferably, the thickness H of the coil 20 is greater than the thickness D of the non-magnetic portion 301, so that the magnetic force lines derived from the non-magnetic portion 301 may basically pass through the coil 20, thereby generating the maximum possible Lorentz force for driving, making the response of the magnetic part 30 more sensitive, preferably, the coil 20 is symmetrically arranged on the non-magnetic portion 301, and the area width B of the two magnet portions 300 covered by the coil 20 is the same, so as to achieve better symmetry.

Figure 9:
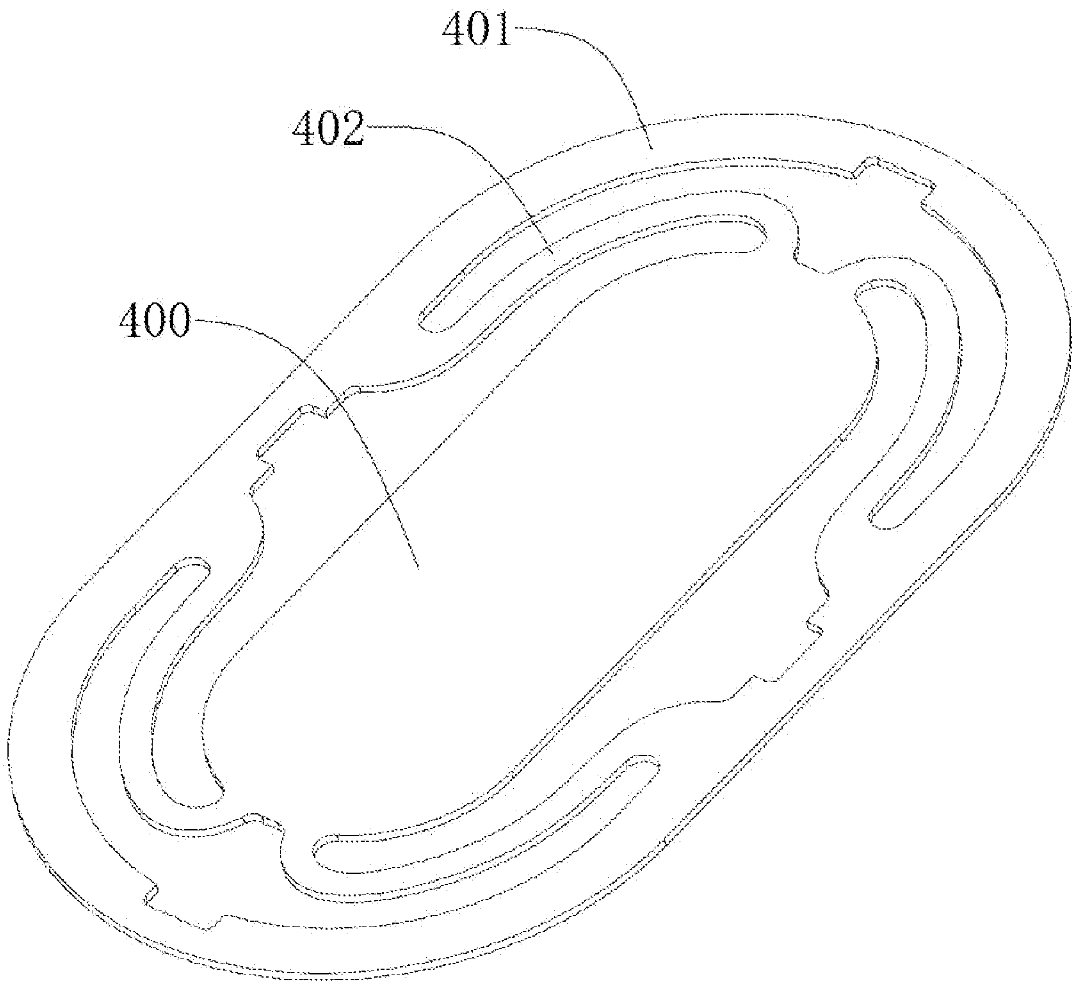
FIG. 9 is a structural schematic diagram of the elastic part in the present invention.

As shown in FIG. 1 and FIG. 3, in the present embodiment, the number of elastic parts is two, that is first elastic part 4 and second elastic part 40, the first elastic part 4 and the second elastic part 40 are respectively arranged on two ends of the magnetic part 30. As a preferred implementation manner, as shown in FIG. 9, the elastic part is in the shape of a sheet to save the space it occupies. The elastic part includes a first installation portion 400 in the middle, a second installation portion 401 surrounding the outer periphery of the first installation portion 400, and a plurality of arm portions 402 connected between the first installation portion 400 and the second installation portion 401. Wherein the first installation portion 400 is used to connect to the end of the magnetic part 30, for example, it may be an adhesive connection; the second installation portion 401 is used to connect to the case 1, for example, it may also be an adhesive connection; the arm portion 402 is used to elastically deform when the magnetic part 30 vibrates, so that the first installation portion 400 moves together with the magnetic part 30, and the arm portion 402 may also provide elastic force to drive the magnetic part 30 to reset.

Since both ends of the magnetic part 30 are provided with elastic parts, the force on both ends is more balanced when vibrating, so that the vibration of the vibration device is more stable, and it may reliably vibrate linearly along the axial direction without rolling vibration, the stability is better and the recovery power is greater.

It can be understood that the size of the first elastic part 4 and the second elastic part 40 may be the same or different, for example, the two may have different thicknesses, the areas of the first installation portion 400 and the second installation portion 401 of the two elastic parts may also be different.

In a preferred embodiment, referring to FIG. 1, the end face of the magnetic part 30 is directly connected to the first installation portion 400, and the area of the magnetic part 30 is less than or equal to the area of the first installation portion 400, so that its outer peripheral surface does not exceed the outer peripheral surface of the first installation portion 400. In this way, the magnetic part 30 does not have a portion in contact with the arm portion 402, so that the arm portion 402 may be elastically deformed more smoothly and fully, thereby improving the low-frequency sound quality of the vibration device. Preferably, the outer contour shapes of the magnetic part 30 and the first installation portion 400 are exactly the same, and the two are coaxially arranged. In another preferred embodiment, referring to FIG. 10 and FIG. 11, a partition plate 5 is arranged between the magnetic part 30 and the first installation portion 400, and the outer peripheral surface of the partition plate 5 does not exceed the outer peripheral surface of the first installation portion 400, in this way, the elastic deformation of the arm portion 402 may not be affected, moreover, the arrangement of the partition plate 5 reduces the size restriction on the magnetic part 30, and the outer peripheral surface of the magnetic part 30 may exceed the outer peripheral surface of the first installation portion 400 without affecting the elastic deformation of the arm portion 402.

Obviously, the magnetic part 30 may not be provided with the partition plate 5, or may be provided with the partition plate 5 only at one end, or may be provided with the partition plate 5 at both ends. When the partition plates 5 are provided at both ends, the dimensions of the two partition plates 5 may be identical or different.

As shown in FIG. 1, FIG. 3 and FIG. 10, the vibration device further includes a first cover 13 and a second cover 14 connected to the two ends of the body 10, the first cover 13 and the second cover 14 respectively seal the two open ends of the body 10 to prevent dust and other foreign matter from entering the interior of the case 1, thereby protecting the internal electromagnetic driving parts, vibrators and other components. The first cover 13 and the second cover 14 are provided with avoidance cavities 130 at the positions corresponding to the arm portion 402 and the first installation portion 400 to avoid them during the movement of the arm portion 402 and the first installation portion 400.

The first cover 13 and the second cover 14 are not necessary and may be provided as appropriate, for example, the first cover 13 and the second cover 14 may not be provided, or only one cover may be provided at one end of the case 1, or both ends of the case 1 may be provided with covers.

The present invention also proposes a bone conduction headphone, the bone conduction headphone includes the above-mentioned vibration device, which may vibrate and produce sound through the above-mentioned vibration device.

The present invention also proposes a wearable device, the wearable device includes the above-mentioned vibration device, the wearable device may be, for example, bone conduction headphones, bone conduction glasses or VR glasses, etc., the above-mentioned vibration device vibrates to produce sound or generates vibration feedback, thereby improving the user experience and comfort.

The present invention also proposes an intelligent hardware device, the intelligent hardware device includes the above-mentioned vibration device, the intelligent hardware device may be, for example, game peripheral hardware, smart fitness equipment, smart TVs, etc., which generate sound through the above-mentioned vibration device, so that the user can hear the sound, or generate vibration feedback through the above-mentioned vibration device to improve the use experience and comfort.

The vibration device in the present invention at least includes the following advantages:

1. In the present invention, the magnetic part is made of magnetic material integrally magnetized, compared with the original structure that requires multiple magnets to be connected, it is an integrated part with fewer parts and no assembly required, and is more convenient to install, while also achieving higher dimensional accuracy, thereby improving the assembly accuracy with the coil reducing the risk of contact and collision between the magnetic part and the coil during the vibration process, so the reliability is higher;
2. Due to the high dimensional accuracy of the magnetic part, the gap between it and the coil may be set smaller, so that the driving force of the coil to the magnetic part is greater, and the sensitivity of the vibration device is higher;
3. In the present invention, both ends of the magnetic part are provided with elastic parts, so that the force on both ends of the magnetic part is more symmetrical, the vibration device can perform linear vibration more stably, and the undesirable phenomenon of rolling vibration is less likely to occur.

The above is only a specific embodiment of the present invention, and any other improvements made on the premise of the concept of the present invention are regarded as the protection scope of the present invention.

What is claimed is:

1. A vibration device, comprising:

a case;

an electromagnetic driving part, including a coil connected to the case; and a vibrator, including a magnetic part movably arranged in the case and an elastic part connected between the magnetic part and the case, the coil surrounding the outside of the magnetic part;

wherein the magnetic part includes at least two magnet portions and a non-magnetic portion located between two adjacent magnet portions, wherein the coil is arranged corresponding to the non-magnetic portion, wherein the thickness of the coil is the same as the thickness of the non-magnetic portion, or the thickness of the coil is greater than the thickness of the non-magnetic portion, and the two ends of the coil extend to the outer peripheries of the two magnet portions adjacent to the non-magnetic portion.

2. The vibration device according to claim 1, wherein, the magnetic part is a component.

3. The vibration device according to claim 1, wherein, the magnetic poles of the magnet portion and the non-magnetic portion are arranged along the axis of the magnetic part, and the polarities of the two adjacent magnetic poles of the two adjacent magnet portions are the same.

4. The vibration device according to claim 1, wherein, the gap between the magnetic part and the coil is 0.05-0.6 mm.

5. The vibration device according to claim 1, wherein, the thickness of the non-magnetic portion is above 0.3 mm.

6. The vibration device according to claim 1, wherein, the number of elastic parts is two, and the two elastic parts are respectively connected to two ends of the magnetic part.

7. The vibration device according to claim 6, wherein, the elastic part comprises a first installation portion, a second installation portion surrounding the outer periphery of the first installation portion, and an arm portion connected between the first installation portion and the second installation portion, wherein the first installation portion is connected with the magnetic part, and the second installation portion is connected to the case.

8. The vibration device according to claim 7, wherein, the magnetic part is connected to the first installation portion, and the outer peripheral surface of the magnetic part does not exceed the outer peripheral surface of the first installation portion; or, a partition plate is connected between the magnetic part and the first installation portion, and the outer peripheral surface of the partition plate does not exceed the outer periphery surface of the first installation portion.

9. The vibration device according to claim 7, further comprising a first cover and a second cover connected to both ends of the case, both the first cover and the second cover are provided with an avoidance cavity for avoiding the arm portion and the first installation portion during the movement of the vibrator.

10. The vibration device according to claim 1, characterized in that, the coil is arranged in the inner cavity of the case or connected to the outside of the case.

11. A bone conduction headphone, characterized in that, comprising the vibration device according to claim 1.

12. An intelligent hardware device, characterized in that, comprising the vibration device according to claim 1.

13. The vibration device according to claim 5, wherein, the maximum value of the thickness of the non-magnetic portion is smaller than the minimum value of the thickness of any one of the magnet portions.

14. The vibration device according to claim 1, wherein, the magnetic part is made by integrally magnetizing the part to be magnetized, when magnetizing, the part to be magnetized is passed through a magnetic conductive sleeve and a polyurethane sleeve, the magnetic conductive sleeve corresponds to the position on the part to be magnetized for forming the non-magnetic portion, the polyurethane sleeve corresponds to the position on the part to be magnetized for forming the magnet portion, a coil set is correspondingly arranged on the outside of the polyurethane sleeve, and the coil set includes one or more magnetizing coils.

15. The vibration device according to claim 14, wherein, during magnetization, the directions of the magnetic fields generated by the adjacent two coil sets corresponding to the positions of the two adjacent polyurethane sleeves are opposite.

* * * * *